United States Patent [19]

Sevenants

[11] Patent Number: 4,675,198
[45] Date of Patent: Jun. 23, 1987

[54] REMOVAL OF TEXTURED VEGETABLE PRODUCT OFF-FLAVOR BY SUPERCRITICAL FLUID OR LIQUID EXTRACTION

[75] Inventor: Michael R. Sevenants, Cincinnati, Ohio

[73] Assignee: The Procter & Gamble Co., Cincinnati, Ohio

[21] Appl. No.: 687,612

[22] Filed: Dec. 31, 1984

[51] Int. Cl.$^4$ .............................................. A23L 1/211
[52] U.S. Cl. .................... 426/425; 426/486; 426/429
[58] Field of Search ............... 426/425, 426, 486, 487, 426/488, 429, 312, 319

[56] References Cited

U.S. PATENT DOCUMENTS

| | | | |
|---|---|---|---|
| 3,477,856 | 11/1969 | Schultz | 99/105 |
| 3,939,281 | 2/1976 | Schwengers | 426/425 X |
| 3,966,981 | 6/1976 | Schultz | 426/425 |
| 3,969,196 | 7/1976 | Zosel | 203/49 |
| 3,998,800 | 12/1976 | Youngquist et al. | 260/123.5 |
| 4,079,155 | 3/1978 | Kakade | 426/634 |
| 4,123,559 | 10/1978 | Vitzthum et al. | 426/319 X |
| 4,152,465 | 5/1979 | Kijima et al. | 426/486 X |
| 4,400,398 | 8/1983 | Coenen et al. | 426/429 |
| 4,427,707 | 1/1984 | Heine et al. | 426/312 |
| 4,466,923 | 8/1984 | Friedrich | 260/412.4 |
| 4,493,854 | 1/1985 | Friedrich et al. | 426/425 X |

FOREIGN PATENT DOCUMENTS

| | | | |
|---|---|---|---|
| 1014571 | 7/1977 | Canada | 260/497.3 |
| 0065106 | 11/1982 | European Pat. Off. | |
| 1385303 | 2/1975 | United Kingdom | |

OTHER PUBLICATIONS

Chem. & Engineering News, Aug. 3, 1981, pp. 16–17.
Food Technology, vol. 24, No. 1282, pp. 94–98 (Nov. 1970).
Chem. Engineering, Jan. 25, 1982, p. 50.
Chem. & Engineering News, vol. 59, No. 21, p. 34, May 25, 1981.

*Primary Examiner*—Robert Yoncoskie
*Attorney, Agent, or Firm*—Gary M. Sutter; Rose Ann Dabek; Richard C. Witte

[57] ABSTRACT

The invention is a method for the removal of off-flavor from a textured vegetable product by extraction with a gas in the supercritical fluid or liquid state. The method for supercritical fluid extraction of off-flavors comprises the steps of: (a) extracting off-flavors from the textured vegetable product by contacting it with a supercritical fluid gas in a pressurized container; and (b) removing the gas and off-flavors from the textured vegetable product. Liquid extraction comprises the steps of: (a) extracting the off-flavors from the textured vegetable product by contacting it with a liquid gas in a pressurized container; and (b) removing the gas and off-flavors from the textured vegetable product. The temperature and pressure of the gas may be varied to maintain it in the supercritical fluid or liquid state. Carbon dioxide is a preferred gas.

12 Claims, 1 Drawing Figure

REMOVAL OF TEXTURED VEGETABLE PRODUCT OFF-FLAVOR BY SUPERCRITICAL FLUID OR LIQUID EXTRACTION

FIELD OF INVENTION

This invention relates to a method for the removal of off-flavor from a textured vegetable product by extraction with a gas in the supercritical fluid or liquid state.

BACKGROUND OF THE INVENTION

The soybean and "vegetable" off-flavor problem in textured vegetable protein has long been recognized. Many methods have been tried for the removal of this off-flavor, but none of the previous methods has been totally acceptable or successful. Such methods include heat treatment, steaming, acid treatment, and treatment with various solvents. It has now been found that supercritical fluid or liquefied gas extraction can be used to remove off-flavors from a textured vegetable product, particularly a textured soybean product.

A number of references utilize supercritical fluid gases or liquefied gases for the separation of organic materials or for flavor extraction. Supercritical fluid carbon dioxide has also been used for the removal of oil from soybeans. However, it appears that this technology has not been applied to a textured vegetable protein product.

U.S. Pat. No. 3,969,196, issued to Zosel (1976) discloses the supercritical fluid gas extraction of a mixture of organic substances. Zosel describes a number of organic compounds which can be extracted by supercritical fluid extraction, for example, aldehydes, ketones, alcohols, amines, esters and acids.

U.S. Pat. No. 3,477,856, issued to Schultz (1969) discloses liquid carbon dioxide extraction of flavors from fruits, vegetables or other plants. The flavor compounds include aldehydes, ketones, esters, and ethers. The patent suggests that supercritical fluid carbon dioxide extraction can also be used.

Canadian Pat. No. 1,014,571, issued to Vitzthum et al. (1977) describes supercritical fluid extraction of fat and oil from vegetable seed material. In particular, supercritical fluid carbon dioxide is used to extract oil from soybeans. Supercritical fluid carbon dioxide extraction of oil from soybeans is also disclosed in U.S. Pat. No. 4,466,923, issued to Friedrich (1984).

U.S. Pat. No. 4,427,707, issued to Heine et al. (1984) describes the extraction of unpleasant taste and odor components from locust beans and guar seeds using supercritical carbon dioxide.

None of these references suggests the use of a gas in the supercritical fluid or liquid state to extract off-flavors from textured vegetable product. Zosel's object is to provide a substitute for fractional distillation, not extraction of plants and plant materials. While Schultz discloses liquid carbon dioxide extraction of flavors from plants, the instant process involves extraction of off-flavor compounds from a textured vegetable product—not the native plant material. The emphasis of the Schultz patent is on isolating positive flavors from flavor-containing liquids—from fruits in particular.

Removal of off-flavors from textured soy product is also different from the method disclosed by Heine et al. The Heine et al. method for deflavoring locust beans and guar seeds would not be applicable in this invention since, as it will be shown later, hydration of the textured vegetable product prior to extraction is critical for off-flavor removal. There is no suggestion in the Heine et al. patent that moisture level is important.

Supercritical carbon dioxide extraction of oil from soybeans as taught by Friedrich requires higher temperatures and pressures (greater than 60° C. and 7977 psia) than does the supercritical carbon dioxide extraction of textured soybean product off-flavor (greater than 31° C. and 1070.6 psia). The textured soy product used in the process described herein is usually made from oil-free soy concentrate. In an article by Friedrich, Snyder, and Christianson, "Effect of Moisture and Particle Size on the Extractibility of Oils from Seeds with Supercritical $CO_2$", JAOCS, Vol. 61, No. 12, pp. 1851-56 (1984), it is stated that moisture levels between 3% and 12% had little effect on extractability. This contrasts with the criticality of moisture level in the instant invention.

It is therefore an object of the instant invention to provide a method for the removal of off-flavors from a textured vegetable product by extraction with a gas in the supercritical fluid or liquid state.

It is another object to provide a method in which the textured vegetable product off-flavors are removed without altering texture.

These and other objects of this invention will become apparent by the description of the invention below.

All percentages are by weight unless otherwise defined.

SUMMARY OF THE INVENTION

The invention is a method for the removal of off-flavor from a textured vegetable product by extraction with a gas in the supercritical fluid or liquid state. The method of supercritical fluid extraction of off-flavors comprises the steps of: (a) extracting off-flavors from the textured vegetable product by contacting it with a supercritical fluid gas in a pressurized container; and (b) removing the gas and off-flavors from the textured vegetable product. Liquid extraction comprises the steps of: (a) extracting the off-flavors from the textured vegetable product by contacting it with a liquid gas in a pressurized container; and (b) removing the gas and off-flavors from the textured vegetable product. The temperature and pressure of the gas may be varied to maintain it in the supercritical fluid or liquid state. Carbon dioxide is a preferred gas.

DETAILED DESCRIPTION OF THE INVENTION

Figure 1:
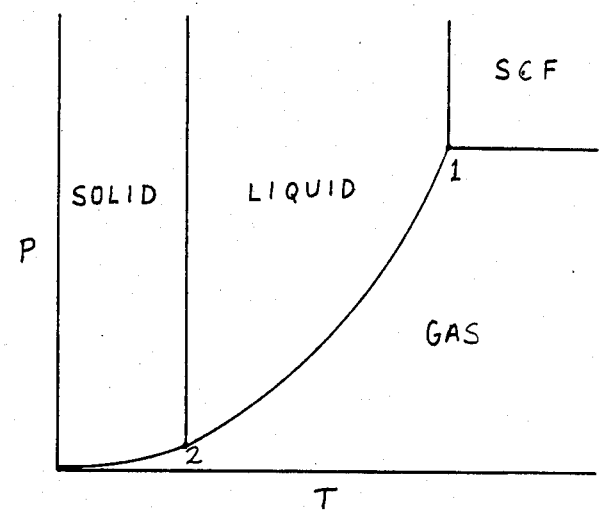
FIG. 1 illustrates the phase diagram of carbon dioxide. Pressure is plotted along the vertical axis (in units of psia) and temperature is plotted along the horizontal axis (in units of °C.).

This invention comprises a process for the supercritical fluid gas or liquid gas extraction of off-flavors from textured vegetable products. More particularly, one aspect of the invention comprises a method for the supercritical fluid gas extraction of off-flavors from a textured vegetable product comprising the steps of: (a) extracting off-flavors from the textured vegetable product by contacting it with a supercritical fluid gas in a pressurized container; and (b) removing the gas and off-flavors from the textured vegetable product. The other aspect of the invention is a method for the liquid extraction of off-flavors from a textured vegetable product comprising the steps of: (a) extracting the off-flavors from the textured vegetable product by contacting it with a liquid gas in a pressurized container; and (b) removing the gas and off-flavors from the textured vegetable product.

Under the high pressures required for extraction with gases in the supercritical fluid or liquid state, the solubility of many organic compounds is increased. This, combined with the greater diffusivity of supercritical fluid or liquefied gases over conventional solvents, results in a more rapid mass transfer through the material to be extracted, and thus a faster rate of extraction. Supercritical fluid gases and liquefied gases have the ability to selectively dissolve and extract organic species from organic mixtures, organic/aqueous mixtures, organic/inorganic matrices and, in the case of foods, lipophilic/hydrophilic matrices.

In the method of this invention, the textured vegetable product material to be extracted is placed into an appropriate container. The container must be strong enough to withstand the high pressures necessary for the supercritical fluid gas and liquefied gas extraction. A source of gas is connected to the container, and means are provided for heating and pressurizing the gas. The temperature and pressure of the extracting gas can be varied to maintain it in the supercritical fluid or liquid state. The textured vegetable product is contacted with the supercritical fluid or liquid gas to effect extraction and removal of the off-flavor compounds. After extraction, the off-flavors are expelled from the container with the exiting gas.

By a "gas" is meant a substance that is gaseous at room temperature and atmospheric pressure. A "supercritical fluid" gas and a "liquid" gas or "liquefied" gas are defined as a gas in the supercritical fluid or the liquid phase according to the phase diagram of the gas. An approximation of the phase diagram of carbon dioxide is illustrated in FIG. 1. The critical temperature of a gas is the temperature above which it cannot be liquefied, no matter how high the pressure. For example, carbon dioxide has a critical temperature of 31° C. (87.8° F.) and a critical pressure of 1070.6 psia (72.8 atm.). The critical point of carbon dioxide is indicated in FIG. 1 by the number "1". Carbon dioxide is in a supercritical fluid (SCF) state when both its temperature and pressure are above the critical temperature and pressure. If the temperature is at the critical point but the pressure is below the critical point, the gas will be in its gaseous state. If the pressure is at the critical point but the temperature is below the critical point, the gas will be in its liquid state. The triple point for carbon dioxide at $-56.6°$ C. ($-69.9°$ F.) and 76.4 psia (5.2 atm.) is indicated by the number "2". The liquid state of carbon dioxide is also illustrated in FIG. 1.

At the critical point (approx. 1070.6 psia and 31° C.) $CO_2$ become a single phase, i.e. liquid-vapor equilibria terminates at this point. The density of a supercritical fluid at the critical point is about 40% that of the normal liquid. In the supercritical fluid and near critical liquid regions, fluids still have high enough density to exhibit liquid-like solubility behavior. Solubility increases with increasing density. Furthermore, the diffusivities in the supercritical fluid range are at least an order of magnitude higher than that of conventional liquid solvents. As a result of these unique characteristics of high solubility and rapid mass transfer supercritical fluids are versatile extracting agents. For further information on extraction with supercritical gases see Angewandte Chemie, Vol. 17, No. 10, pp. 701–784 (1978).

A variety of gases can be used as the supercritical fluid or liquid gas of this development. The gas can be organic or inorganic. The organic hydrocarbons ethane, ethylene, propane, propylene, and butane can be used. Inorganic compounds such as carbon dioxide and nitrous oxide can also be used. Inert gases such as carbon dioxide are convenient to use in this development because they do not react with the textured vegetable product, they are nonflammable, and the problem of residual gases is eliminated since the gases are nontoxic. For certain applications it may be necessary for the gas to be food compatible and/or FDA approved.

This development is particularly applicable to the extraction of off-flavors from a textured vegetable protein product or meat analog. Meat analogs are becoming increasingly commercially important in the food industry. A major problem has been the removal of the distinct soybean off-flavor which is inherent in the soybean protein materials. The method of this development is meant to be a solution to this soybean off-flavor problem. It was discovered that supercritical fluid extraction (SFE), carbon dioxide with high solvent power and high diffusivity as the extracting fluid, could effectively remove meat analog off-flavors without altering the texture of the analog.

The broad range of compounds contributing to textured soybean product off-flavor include aldehydes, ketones, phenols, alcohols, and heterocyclic compounds. These compounds exhibit varying degrees of solubility in conventional solvents, but they are effectively extracted with the liquid or supercritical fluid gases in the method of the instant development. The result of this process is that off-flavors including raw soy off-flavors, oxidative off-flavors and heat-generated off-flavors are removed from textured soy products leaving a bland soy base. Protein, amino acids and other nutrients are not removed and the texture of the product is not altered by the extraction process. Meat flavors and other flavors can be subsequently added to the bland soy base to produce a desirable meat-like product.

Although the present method is particularly suited to the removal of off-flavors from textured vegetable protein made from soybeans, the method is not limited thereto.

The "textured vegetable protein" or meat analog to be extracted can be made of 100% vegetable protein, or it can include up to 50% other protein material. Examples of suitable vegetable protein sources are soybeans, safflower seed, corn, peanuts, wheat, peas, sunflower seed, cottonseed, coconut, rapeseed, sesame seed, leaf proteins, single cell proteins such as yeast, and the like. Generally, if the protein source is a vegetable protein, the protein prior to use is placed in a relatively pure form. Thus, for example, if the protein source is soybeans, the soybeans can be dehulled and solvent extracted, preferably with hexane, to remove the oil therefrom. The resulting oil-free soybean meal is then suspended in water, and alkali is added to dissolve the protein and leave behind undissolved carbohydrates. Thereafter the protein is precipitated from the alkaline solution by the addition of an acidic substance. Precipitated protein is then washed and dried to prepare a substantially pure protein isolate.

If desired, animal protein sources can be used (up to 50%). These include animal proteins such as those derived from milk, poultry, meat, and/or fish. A typical example of a suitable animal protein is egg albumin.

Currently, most meat analog products are made by two basic processes: that is, either fiber spinning or thermoplastic extrusion. In the fiber spinning method, fibrous protein products are prepared from proteins such as soy protein by forming a spinning dope from alkali-treated protein and extruding the dope through a perforated die or membrane into an aqueous precipitating bath which contains an acid or an acid salt. The acid bath sets the filaments or fibers which are formed in the bath. The filaments may be bundled together and stretched to orient the molecular structure of the fibers.

The thermoplastic extrusion process involves preparing a mixture of protein, water, flavor, and other minors, and thereafter feeding the mixture into a cooker-extruder wherein it is subjected to heat and pressure, and subsequently extruding the mixture. The extrudate as it enters into the atmosphere expands to form meat-like fibers.

It was discovered that a moisture content of 62% in a textured vegetable protein made of twin screw extruded soy protein was the optimum moisture content for efficient supercritical fluid or liquid extraction. At this level the extrudate was totally hydrated with no excess moisture present; i.e., when squeezed free moisture could not be expelled from the extrudate. While not intending to be bound by theory, it is believed that excess free water on the surface or in the capillary spaces in the protein structure of the textured vegetable protein blocks the penetration of the supercritical fluid or liquid gas and thereby reduces extraction efficiency. For example, $CO_2$ is not soluble in water, so any excess or free water acts as a barrier to the $CO_2$, thus detracting from the efficiency of extraction. On the other hand, there must be a sufficient amount of moisture present to release the molecules of off-flavor from the protein structure of the textured vegetable protein so that they can be solvated and extracted by the gas. At a moisture content of 62% for a soy protein twin screw extrudate, just enough water is added to hydrate the protein and release the bound off-flavor molecules. Different vegetable proteins may hydrate differently. Hydration will vary depending on the type of protein and the extent of denaturation as well as other physical properties. What is important is the fact that there is an optimum moisture for the textured vegetable product, and that optimum is the point at which the product is fully hydrated but there is no excess moisture. This point will be referred to as "fully hydrated". Preferably, the textured vegetable product should be hydrated to a moisture content of within about 30% of its fully hydrated point. Most preferably, it should be hydrated to a moisture content of within about 10% of its fully hydrated point. For example, for twin screw extruded soy protein the moisture level of the protein is preferably between about 52% and 72%.

The flow rate of the gas during the extraction affects the efficiency of extraction. As the off-flavors are dissolved in the supercritical fluid or liquid gas from the textured vegetable product, there are also some off-flavor molecules leaving the gas and being absorbed back into the textured vegetable product. The direction of this equilibrium is determined by the concentrations of off-flavor molecules in the gas and in the textured vegetable product. The molecules will tend to go from an area of high concentration to an area of low concentration. Therefore, generally a faster flow rate results in faster extraction because the concentration of off-flavors in the gas is kept low as fresh gas is provided.

If desired, the extracting gas can be processed for reuse. Several methods are available for removing off-flavor solutes from a supercritical fluid gas. In one method, pressure is reduced in an expansion chamber. On reducing the pressure, the supercritical fluid becomes gaseous, thus losing its solvent properties. The off-flavor solutes then precipitate in the chamber and the supercritical fluid gas is recycled. In another method the temperature of the recovery chamber is increased well above the critical temperature causing the supercritical fluid to convert to the gaseous state. The solutes precipitate as a result of the conversion. Relatively non-volatile off-flavor solutes can be recovered by this method. In a third method an adsorption substrate, i.e. silica gel, porous polymers, or activated carbon, is used to trap organic solutes. The adsorption chamber is maintained at atmospheric pressure, allowing the extracting gas to pass through the substrate as a gas while the heavier solute molecules are trapped in the substrate. The trapped solutes are subsequently desorbed by solvent elution or heating. Another method utilizes a solvent scrubber.

EXAMPLE I

A J&W High Pressure Soxhlet Extractor (J&W Scientific Cat. No. 300-100) was used for liquid carbon dioxide extraction of soybean extrudate. Four runs were made. The extraction temperature was about 1° C., the amount of $CO_2$ used for the extractions was about 160 g, the moisture content of the extrudate samples was 75% (except for run #2), and the samples weighed about the same. Run #1 used a pressure of 650 psia; run #2 used 700 psia, run #3 used 700 psia, and run #4 used 700-750 psia. Run #1 used a sample of hydrated (to 75%) soybean extrudate, while run #2 used a sample of dry soybean extrudate. Good extraction of off-flavor occurred in run #1, but in run #2 off-flavor was only extracted from the surface of the extrudate. This demonstrates that the extrudate must be hydrated to release the bound flavor molecules, in order to get efficient extraction. In run #2 the flavor molecules were not released from the protein molecules, so extraction only occurred at the surface of the extrudate. Runs #3 and #4 differed in their extraction times. In Run #3 a 3-hour extraction removed about 90% of the soybean off-flavor (by taste). In run #4 a 6-hour extraction removed 100% of the off-flavor.

EXAMPLE II

Soybean extrudate was extracted by supercritical fluid carbon dioxide. The extracting apparatus comprised a $CO_2$ source, a compressor, a heat exchanger, pressure regulators, and a container consisting of a length of pipe (11/16" inner diameter, 12" length for smaller samples [a] and [b]; 2" i.d., 2'-4' length for larger samples [c]-[f]) in which the sample was placed. The $CO_2$ was flowed through the compressor and heat exchanger to achieve greater than supercritical temperature and pressure, and then flowed through the sample in the container.

The following runs were performed on the supercritical fluid carbon dioxide extraction of soybean extrudate. The extraction temperature was 55° C.±5° C.

| Run # | Weight Extrudate | Percent Moisture | Volume CO$_2$ (liters) | Pressure |
|---|---|---|---|---|
| (a) | 47.83 g | 76% | 1,700 | 2,000 to 4,000 psia |
| (b) | 8.40 g | 21% | 430 | 5,000 psia |
| (c) | 203.66 g | 74% | 5,300 | 5,000 psia |
| (d) | 214.32 g | 75% | 5,200 | 5,000 psia |
| (e) | 400 g | 62% | 5,050 | 4,500 psia |
| (f) | 490 g | 62% | 9,000 | 4,500 psia |

In run #(a) the pressure was increased as the run progressed. As the pressure increased, more off-flavor was noted at the outlet. The product was virtually (95%) bland at the end of the run. This demonstrates that the pressure can be adjusted to change the CO$_2$ solvent efficiency. The higher the pressure, the greater the efficiency of extraction.

In run #(b) the extrudate contained only 21% moisture. The extrudate was odorless after extraction. However, when hydrated to about 75% moisture after extraction off-flavor emerged from the extrudate. This demonstrates that the extrudate must be fully hydrated prior to extraction to release the bound flavor molecules, in order for supercritical fluid extraction to be effective. Supercritical fluid extraction of partially hydrated extrudate removes only off-flavors bound to the outer surface of the extrudate.

Run #(c) demonstrates good off-flavor removal of supercritical fluid extraction. By taste evaluation and comparison to unextracted, hydrated extrudate, about 80-90% of the off-flavor was removed.

Run #(a) was more effective than run #(c) because of the weight of the extrudate samples. The smaller sample in run #(a) was more easily extracted, because of its greater surface/volume ratio.

In run #(d), good extraction was achieved as about 80-90% of the off-flavor was removed.

Run #(e) took 8 hours. The resulting product was odorless and bland in taste. The texture was unchanged.

Run #(f) took 12 hours. The resulting product was odorless and bland in taste. The texture was unchanged. In runs #(e) and #(f) the moisture content of the extrudate was 62%. As mentioned before, this moisture content was hypothesized to be the optimum content. In runs #(e) and (f) all the off-flavor was removed because the extrudate was at the optimum moisture level. Runs #(a), (c) and (d) used excess moisture. In these runs about 80-95% of the off-flavor was removed, instead of all of the off-flavor.

EXAMPLE III

Soybean extrudate is prepared in the following manner. A soy protein concentrate, Procon 2000, manufactured by the A. E. Staley Company, is mixed with water to a moisture level of about 40% and worked to a dough in a Werner & Pfleiderer twin screw extruder in a manner so that strands of extrudate are formed. The dough temperature immediately prior to exit from the extruder is about 170° C. (338° F.) and the pressure is about 600 psig. As the strands of dough exit from the extruder die, they are expanded somewhat by release of steam to a diameter of about 6 mm. The extrudate strands are cut into lengths of about 1.5 cm by a rotary shear. The pieces are air conveyed to a knife impact mill with 16 blades rotating at a tip velocity of about 48 m/sec. Particles are sheared and reduced in size as they impact against a plate perforated with ⅜" square openings at the mill discharge. This creates a particulate extrudate.

What is claimed is:

1. A method for the supercritical fluid extraction of off-flavors from a textured vegetable product comprising the steps of:
    (a) contacting textured vegetable product, hydrated to a moisture content of within about 30% of its fully hydrated point, with a supercritical fluid in a pressurized container; and
    (b) removing the supercritical fluid and off-flavors from the textured vegetable product.

2. A method according to claim 1 wherein the textured vegetable product is a textured soybean product.

3. A method according to claim 1 wherein the supercritical fluid is a hydrocarbon gas.

4. A method according to claim 1 wherein the supercritical fluid is carbon dioxide.

5. A method according to claim 1 wherein the textured vegetable product is hydrated to a moisture content of within about 10% of its fully hydrated point.

6. A method according to claim 5 wherein the supercritical fluid is selected from the group consisting of carbon dioxide, nitrous oxide, ethane, ethylene, propane, propylene and butane.

7. A method for the liquid extraction of off-flavors from a textured vegetable product comprising the steps of:
    (a) contacting textured vegetable product, hydrated to a moisture content of within about 30% of its fully hydrated point, with a liquid gas in a pressurized container; and
    (b) removing the gas and off-flavors from the textured vegetable product.

8. A method according to claim 7 wherein the textured vegetable product is a textured soybean product.

9. A method according to claim 8 wherein the gas is a hydrocarbon gas.

10. A method according to claim 7 wherein the gas is carbon dioxide.

11. A method according to claim 7 wherein the textured vegetable product is hydrated to a moisture content of within about 10% of its fully hydrated point.

12. A method according to claim 11 wherein the liquid gas is selected from the group consisting of carbon dioxide, nitrous oxide, ethane, ethylene propane, propylene and butane.

* * * * *